(12) United States Patent
Zhang et al.

(10) Patent No.: US 12,523,221 B2
(45) Date of Patent: Jan. 13, 2026

(54) NON-INTRUSIVE MEASUREMENT METHOD FOR DYNAMIC CHARACTERISTIC OF CYLINDER BLOCK IN AXIAL PISTON PUMP

(71) Applicant: ZHEJIANG UNIVERSITY, Zhejiang (CN)

(72) Inventors: Junhui Zhang, Hangzhou (CN); Bing Xu, Hangzhou (CN); Qi Zhao, Hangzhou (CN); Haogong Xu, Hangzhou (CN); Weidi Huang, Hangzhou (CN); Fei Lyu, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 294 days.

(21) Appl. No.: 18/508,268

(22) Filed: Nov. 14, 2023

(65) Prior Publication Data

US 2024/0077072 A1    Mar. 7, 2024

Related U.S. Application Data

(63) Continuation of application No. PCT/CN2022/089845, filed on Apr. 28, 2022.

(30) Foreign Application Priority Data

May 14, 2021  (CN) .......................... 202110528760.X

(51) Int. Cl.
  *F04B 51/00*  (2006.01)
  *G01H 11/02*  (2006.01)
(52) U.S. Cl.
  CPC ............. *F04B 51/00* (2013.01); *G01H 11/02* (2013.01); *F04B 2201/0802* (2013.01)

(58) Field of Classification Search
  CPC ... F04B 51/00; F04B 2201/0802; G01H 11/02
  See application file for complete search history.

(56) References Cited

U.S. PATENT DOCUMENTS

2016/0341193 A1* 11/2016 Du .......................... F04B 17/05

FOREIGN PATENT DOCUMENTS

| CN | 104400560 A | * | 3/2015 | ............. B23Q 17/00 |
| CN | 105043317 A | * | 11/2015 | ............. G01B 21/00 |

(Continued)

OTHER PUBLICATIONS

International Search Report (PCT/CN2022/089845); Date of Mailing: Jul. 11, 2022.

(Continued)

*Primary Examiner* — Jamel E Williams
(74) *Attorney, Agent, or Firm* — Wiersch Law Group

(57) ABSTRACT

Provided is a dynamic characteristic measurement method for a cylinder block of a non-intrusive axial piston pump. The cylinder block is the main rotating component of the axial piston pump, and the dynamic characteristic of the cylinder block is more capable of reflecting the health condition of the pump than an external characteristic. A non-contact type measurement scheme is provided so as to reduce the influence of a measurement device on the motion of the cylinder block. Cylinder block contour signals and radial displacement signals are obtained by measuring the radial displacement of two sections of the surface of the cylinder block under different working conditions in the perpendicular directions, and then the cylinder block contour signals are accurately removed from the radial displacement signals to obtain the translational and tilting motion characteristics of the cylinder block.

2 Claims, 4 Drawing Sheets

(56) References Cited

FOREIGN PATENT DOCUMENTS

| CN | 105782049 | A | * | 7/2016 | ............. F04B 51/00 |
| CN | 106595462 | A | * | 4/2017 | ............. G01B 7/105 |
| CN | 107598194 | A | * | 1/2018 | |
| CN | 108266361 | A | * | 7/2018 | ............. F04B 51/00 |
| CN | 110057580 | A | | 7/2019 | |
| CN | 113107834 | A | * | 7/2021 | ............. F04B 51/00 |
| DE | 102016112965 | A1 | | 1/2018 | |

OTHER PUBLICATIONS

First Office Action(CN202110528760.X); Date of Mailing: Nov. 23, 2021.

* cited by examiner

NON-INTRUSIVE MEASUREMENT METHOD FOR DYNAMIC CHARACTERISTIC OF CYLINDER BLOCK IN AXIAL PISTON PUMP

CROSS-REFERENCE TO RELATED APPLICATIONS

The present application is a continuation of International Application No. PCT/CN2022/089845, filed on Apr. 28, 2022, which claims priority to Chinese Application No. 202110528760.X, filed on May 14, 2021, the contents of both of which are incorporated herein by reference in their entireties.

TECHNICAL FIELD

The present disclosure relates to the field of condition monitoring and fault diagnosis and in particular, to dynamic characteristic measurement, working condition health monitoring, and fault diagnosis of rotating cylinder block. In particular, the present disclosure relates to a non-intrusive method for measuring dynamic characteristics of a cylinder block in an axial piston pump.

BACKGROUND

In order to meet the demand of intelligent hydraulic system and components, an axial piston pump is required to have the ability to perceive self-information to monitor its health status during operation. For another, fault diagnosis is an important research field for the axial piston pump. In the past, the research on condition monitoring and fault detection of the axial piston pump mainly relied on vibration signal of the shell, supplemented by pressure signal and leakage flow signal. However, the vibration signal of the shell will also be affected by other factors. In addition, the fault signal can only be measured when it is transmitted to the shell through different transmission paths, which weakens the fault signal. Therefore, the weak change, caused by a fault, of vibration signal is submerged in background noise, which brings great challenges to the condition monitoring and fault detection of the axial piston pump. Since the fault signal transmission path is short, and the movement of the rotating component relative to the shell is almost unaffected by the external environment, the movement behavior of the rotating component can more directly reflect the health status of the pump. Therefore, in the actual system, measuring the dynamic characteristics of the rotating component is a necessary condition for condition monitoring and fault detection.

In previous studies, the dynamic characteristics of the cylinder block were measured under the actual working conditions, and the shell and even the rotating component of the axial piston pump were modified to obtain enough information. The modification of the rotating component has a certain influence on the dynamic characteristics of the cylinder block. In addition, the tilting behavior of the cylinder block is studied by using the average thickness of oil film of the measuring point, but enough attention was not paid on the research on its transient characteristics.

SUMMARY

The object of the present application is to invent a new non-contact measurement and monitoring method aiming at the shortcomings of the prior art, which has less changes to the pump, and can accurately obtain the translation and tilt motion signals of the cylinder block of the test pump under real working conditions through the signal extraction method.

The object of the present application is achieved through the following technical solution: a non-intrusive method for measuring the dynamic characteristics of an axial piston pump cylinder, including the following steps:

(1) Acquiring a radial displacement signal of a cylinder block of an axial piston pump; taking the axial piston pump as a test pump driven by the first motor through a spline coupling, controlling the pressure by a throttle valve in an outlet pipeline of the test pump, synchronously measuring the rotational speed pulse of the test pump by using a rotational speed sensor, and acquiring radial displacement signals along X axis and Y axis on two cross sections of the cylinder block surface of the test pump by using two groups of eddy current sensors, specifically, converting the rotational speed pulse signal into a rotation angle signal of the shaft, dividing the rotation angle signal and the radial displacement signal into several segments based on the rotation angle of the shaft, and then interpolating the signal of each segment to ensure a same data length; averaging displacement data of each data segment according to data points, and then obtaining the relationship between the displacement and the rotation angle, so as to obtain the radial displacement signal of the cylinder block rotating for one cycle.

(2) Acquiring the contour signal of the cylinder block of the axial piston pump; the test pump is driven by the second motor through a reducer, wherein the reducer represents a reducer with double output shafts, and the output shafts are connected with the test pump and an encoder, respectively; measuring the rotational speed pulse of the test pump by the encoder, which is used to accurately measure the rotation cycle of the cylinder block of the pump, wherein the encoder has a zero signal, which can mark an initial position for cylinder block contour measurement; acquiring the displacement signal of the cylinder block through the two groups of eddy current sensors at low speed condition, wherein the cylinder block of the axial piston pump will not tilt obviously, and the radial displacement signal at this time can be regarded as the contour signal of the cylinder block; resampling the contour signal acquired by the eddy current sensor in each rotation cycle according to the pulse measured by the encoder, so that the data length of the contour signal is consistent with a data length of the radial displacement signal acquired in step (1) in each cycle.

(3) Calculating the delay between the radial displacement signal and the contour signal by a cross-correlation method, and realizing an alignment between the radial displacement signal and the contour signal by shifting the contour signal; obtaining displacements of two measured section centers of the cylinder block through a difference between the aligned radial displacement signal and the contour signal; and calculating radial vibration and tilt characteristics of the cylinder block according to the displacements of the two measured section centers of the cylinder block.

Further, four threaded holes are machined on the shell of the test pump for installing the eddy current sensors, and the eddy current sensors are fixed by double nuts to prevent looseness during operation.

The present application has the following beneficial results:
1. Non-contact measurement method can reduce the influence of the test equipment on the movement of the cylinder block and ensure the real movement of the cylinder block, which can be applied to the measurement and monitoring of actual working conditions.
2. Through the signal extraction method, the real displacement signal of the cylinder block is accurately stripped to ensure the accuracy of the transient analysis results, and the measurement accuracy is improved.
3. The amount of modification is small, and test can be directly performed on the commercial pump.
4. By using this measuring device, the motion measurement of the cylinder block in different fault modes can be further studied, and on-line fault detection can be carried out based on the motion signal of the cylinder block.

DESCRIPTION OF EMBODIMENTS

In the following, the preferred embodiments of the present application will be described in detail with reference to the attached drawings, so that the advantages and features of the present application can be more easily understood by those skilled in the art, and the protection scope of the present application can be more clearly defined.

Figure 1:
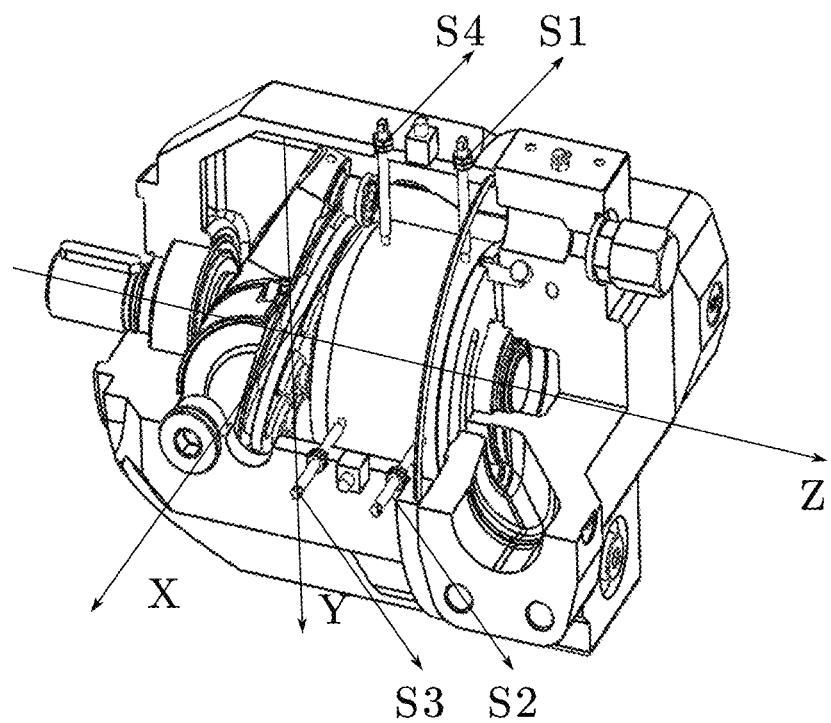
FIG. 1 is a schematic diagram showing the dynamic characteristics of a test pump cylinder block.
Figure 2:
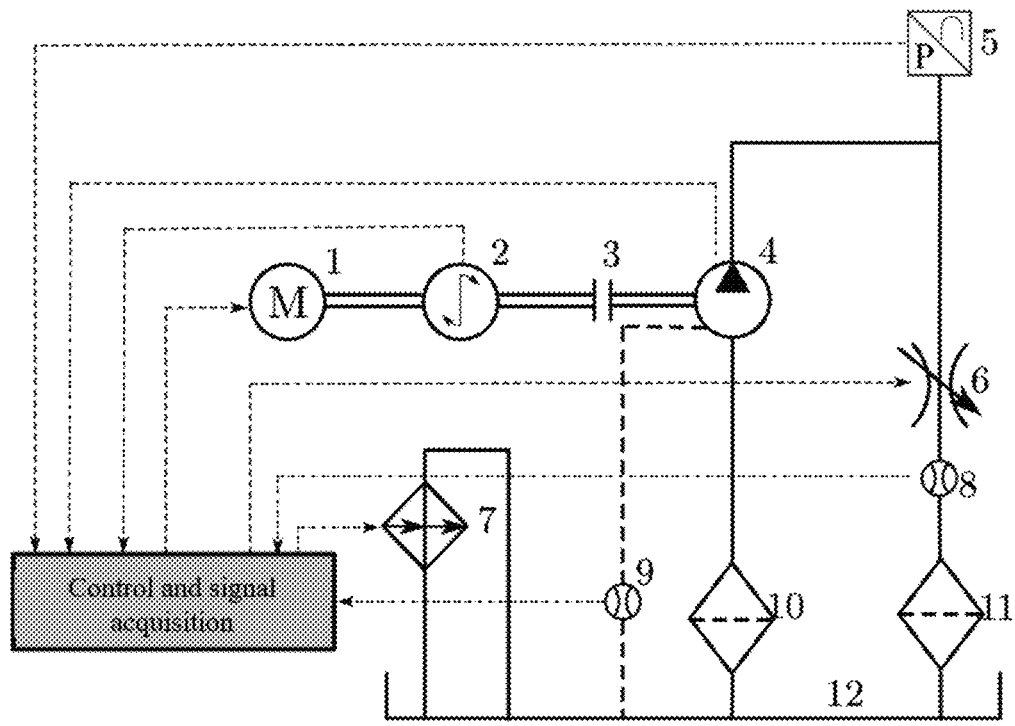
FIG. 2 is a schematic diagram of the testing principle of the method of the present application.

The test pump is shown in FIG. 1, and the schematic diagram of the adopted hydraulic test circuit is shown in FIG. 2. In FIG. 2, a motor 1, a torque meter 2, a coupling 3 and a test pump 4 are connected in sequence, and the inlet port of the test pump 4 is connected to an oil tank 12 through a filter 10, and the drain port of the test pump is connected to the oil tank 12 through the second flowmeter 9. At the same time, the outlet port of the test pump 4 is also connected to the oil tank 12 through a control valve 6, the first flowmeter 8 and the second filter 11. A pressure sensor 5 measures the outlet pressure of the test pump 4. A temperature regulator 7 and the oil tank 12 form a loop, and a control system collects signals from the torque meter 2, the pressure sensor 5, the first flowmeter 8 and the second flowmeter 9 to control the motor 1, the control valve 6 and the temperature regulator 7. A signal acquisition system acquires the sensor signals on the test pump 4. The contour calibration test rig mainly consists of the second motor, the test pump, a rotational speed sensor, and a motor-connected reducer with double output shafts, and the reducer is connected with the test pump and an encoder respectively.

The specific test steps are as follows:
As shown in FIG. 1, a global Cartesian coordinate system X-Y-Z is adopted, and its origin is located in the center of the spline coupling pair. The Z axis coincides with the axis center line of the shaft and points to the rear end cover, and the Y axis points from the bottom dead center of the valve plate to the top dead center. The shaft rotates counterclockwise around the Z axis. The method of the present application adopts two groups of eddy current sensors (S1 and S2, S3 and S4) to measure the radial displacement along the X axis and the Y axis on two sections of the cylinder block surface. Four eddy current sensors are installed on the shell where four threaded holes are manufactured, and the sensors are fixed with double nuts to prevent the eddy current sensors from loosening during operation.

Figure 4:
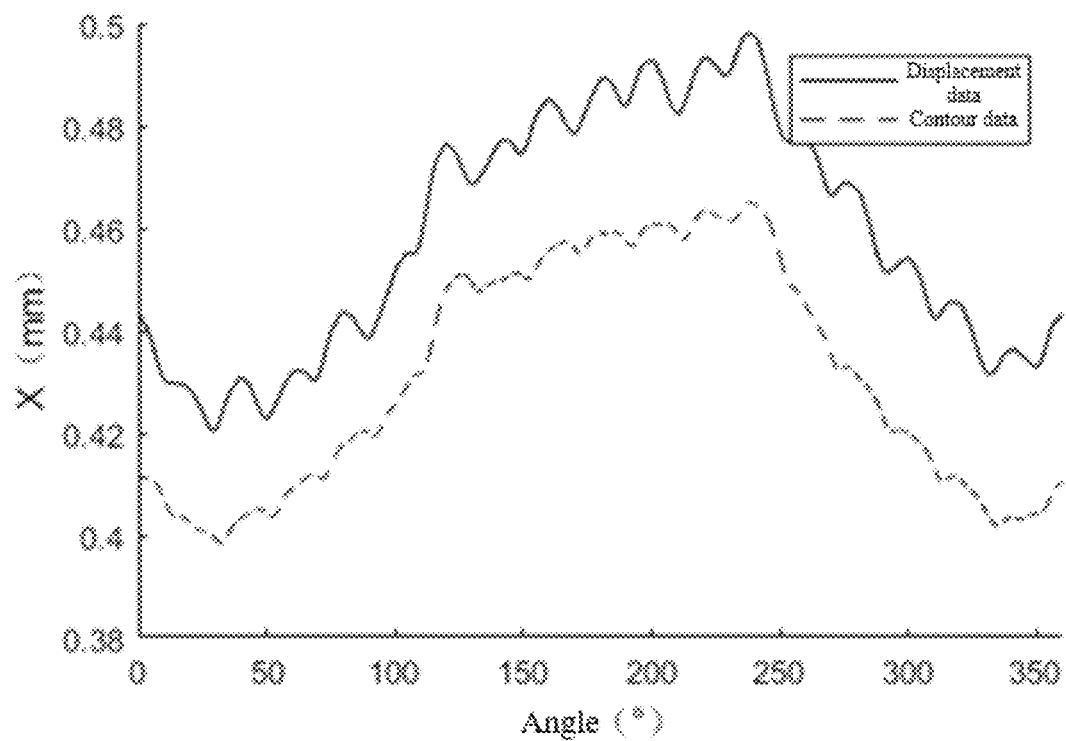
FIG. 4 is a schematic diagram of a measurement signal and a contour signal.

The radial displacement signals of the cylinder block are collected when the axial piston pump is at a high speed. The test pump is driven by a motor through a coupling, the pressure is controlled by a throttle valve in the outlet pipeline of the test pump, and the oil temperature is controlled by a radiator; the rotational speed pulse is measured by a rotational speed sensor, and four sets of radial displacement signals on two sections of the cylinder block surface are collected by two groups of eddy current sensors. Four groups of displacement signals are processed. Taking one group as an example, firstly, the rotational speed pulse signal is converted into the rotation angle signal of the shaft, and then the rotation angle signal and displacement signal are divided into several segments according to the rotation cycle, and then the signal of each segment is interpolated to ensure the same data length. The displacement data of each data segment are averaged according to the data points, and then the relationship between the displacement and rotation angle is obtained, so that a group of radial displacement signals of the cylinder block can be obtained. In the same way, the other three groups of data are processed, and four groups of cylinder block radial displacement signals are obtained as shown in FIG. 4, in which the solid line is a group of radial displacement signals of the cylinder block.

The contour signals of the cylinder block of the axial piston pump are collected at a low speed and a low pressure condition. An accurate contour signal is obtained by a contour signal calibration method. The test pump is driven by a motor through a reducer, which is a reducer with double output shafts and is respectively connected with the test pump and an encoder. The encoder measures the rotational speed pulse signal of the test pump, and four groups of radial displacement signals on two sections of the cylinder block surface are collected through two groups of eddy current sensors. Due to the low speed and low pressure, the load on the piston pump cylinder block is very small, which will not cause obvious tilt. At this time, the radial displacement signal can be regarded as the contour signal of the cylinder block. Four groups of cylinder block contour signals are obtained in total similar to the process of radial displacement signal data processing. As shown in FIG. 4, the dotted line is a set of contour signals of the cylinder block.

Figure 5:
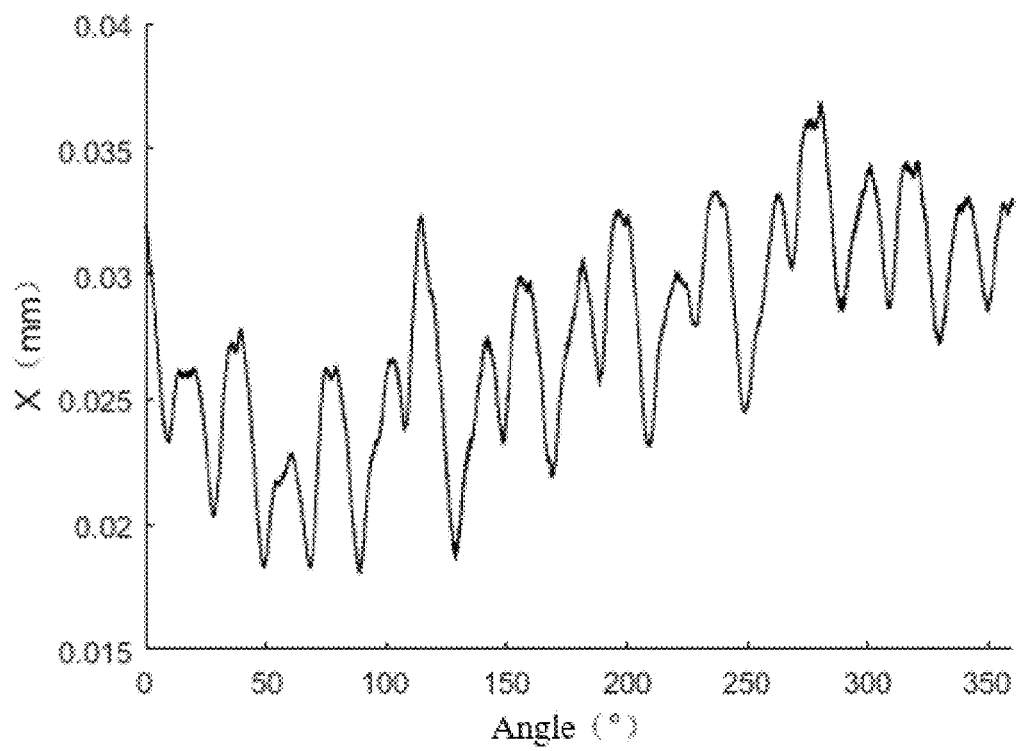
FIG. 5 is a schematic diagram of the test results.

Since the encoder has a zero position signal and the speed sensor has no zero position signal, it is necessary to align the radial displacement signal with the contour signal, the delay between the radial displacement signal and the contour signal is calculated through the cross-correlation method based on the characteristic extreme value, and the alignment between the radial displacement signal and the contour signal is realized by shafting the radial displacement signal. The displacements of the two measured section centers of the cylinder block are obtained from the difference between the aligned radial displacement signal and the contour signal. As a result, the actual motion characteristics of the test section centers o1 and o2 of the cylinder block are obtained by removing the contour signal from the measured radial displacement signal. FIG. 5 shows the actual motion characteristics of the section centers of the cylinder block.

Figure 3:
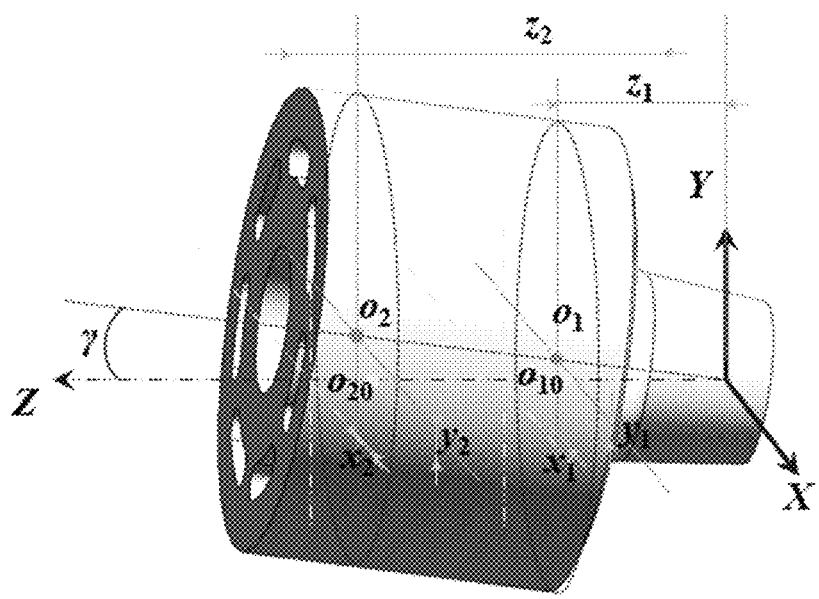
FIG. 3 is a schematic diagram of cylinder block movement.

Since the cylinder block and the shaft are connected by spline coupling, the movement of the cylinder block can be divided into translation movement and tilt movement around the center of the spline coupling. As shown in FIG. 3, the motion of the cylinder block is described by two cross-sectional centers. $o_{10}$ and $o_{20}$ represent the initial positions of $o_1$ and $o_2$ respectively. The translational displacement of the spline center can be expressed as $$x_s = x_2 - z_2 \frac{x_2 - x_1}{z_2 - z_1} \quad (1)$$

$$y_s = y_2 - z_2 \frac{y_2 - y_1}{z_2 - z_1} \quad (2)$$

where $x_1$-section 1 displacement along the x direction, $y_1$-section 1 displacement along the y direction, $z_1$-axial distance from the spline center to the section 1, $x_2$-section 2 displacement along the x direction, $y_2$-section 2 displacement along the y direction, $z_2$-axial distance from the spline center to the section 2, $x_s$-spline center displacement along the x direction, and $y_s$-spline center displacement along the y direction.

The tilt azimuth of the cylinder block represents the position of the minimum oil film thickness of the valve plate/cylinder block pair. The tilt angle and tilt azimuth can be expressed as $$\gamma = \arctan \frac{\sqrt{((y_2 - y_1)^2 + (x_2 - x_1)^2)}}{z_2 - z_1} \quad (3)$$

$$\alpha = \begin{cases} \arctan\left(\frac{y_2 - y_1}{x_2 - x_1}\right); & x_2 - x_1 > 0 \\ \arctan\left(\frac{y_2 - y_1}{x_2 - x_1}\right) + \pi; & x_2 - x_1 < 0 \end{cases} \quad (4)$$

where, $\gamma$-tilt angle, $\alpha$-tilt azimuth angle.

Figure 6:
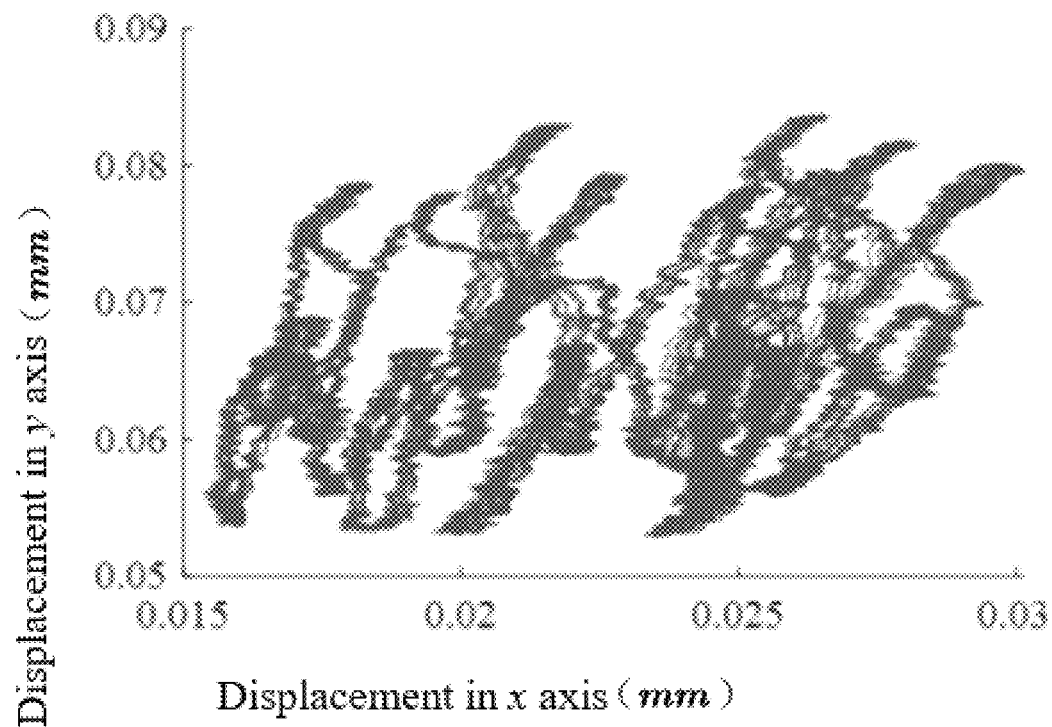
FIG. 6 is a schematic diagram of the trajectory of the cylinder block.
Figure 7:
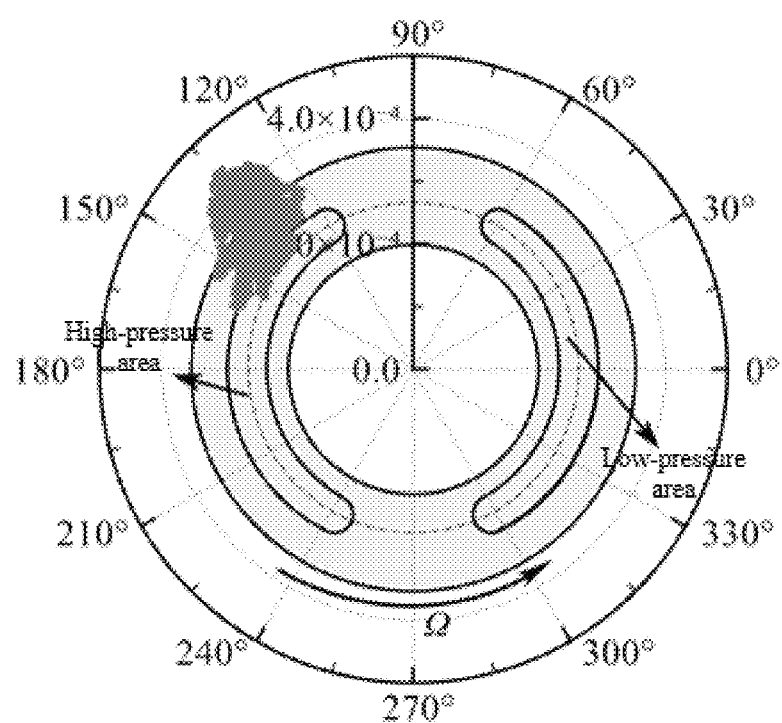
FIG. 7 is a schematic diagram of the tilt movement of the cylinder block.

According to the displacement of the center of the measured section and the formulas (1), (2) and (3) and (4), the radial vibration and tilt characteristics of the center of the spline can be obtained. The schematic diagram of the center trajectory of the spline is shown in FIG. 6, and the schematic diagrams of tilt angle and tilt azimuth are shown in FIG. 7.

The above is only the embodiment of the present application, which does not limit the patent scope of the present application. Any equivalent structure or equivalent process transformation made by using the contents of the specification and drawings of the present application, or directly or indirectly applied to other related technical fields, are equally included in the patent protection scope of the present application.

What is claimed is:

1. A non-intrusive method for measuring dynamic characteristics of an axial piston pump cylinder block, comprising:
    step (1): acquiring a radial displacement signal of a cylinder block of an axial piston pump; taking the axial piston pump as a test pump, connecting the test pump to a first motor through a coupling, controlling the pressure by a throttle valve in an outlet pipeline of the test pump, synchronously measuring the rotational speed pulse of the test pump by using a rotational speed sensor, and acquiring radial displacement signals of the cylinder block surface along the X axis and the Y axis on two sections in the test pump by using two groups of eddy current sensors, a process of acquiring the radial displacement signals comprises: converting the rotational speed pulse signal into a rotation angle signal of a shaft, dividing the rotation angle signal and the radial displacement signal into several segments according to a rotation cycle of the shaft, and interpolating the rotation angle signal and the radial displacement signal of each segment to ensure a same data length; averaging displacement data of the data segments in each data point, and obtaining the relationship between the displacement and the rotation angle, so as to obtain the radial displacement signal of the cylinder block in one cycle;
    step (2): acquiring a contour signal of the cylinder block of the axial piston pump; connecting the test pump to the second motor through a reducer, wherein the reducer represents a reducer with double output shafts, connected with the test pump and an encoder, respectively; measuring the rotational speed pulse of the test pump by the encoder accurately, wherein the encoder has a zero position signal to mark an initial position for cylinder block contour measurement; acquiring the displacement signals of the cylinder block through the two groups of eddy current sensors, wherein the cylinder block of the axial piston pump does not tilt obviously under low speed and low pressure condition, and the radial displacement signal can be regarded as the contour signal of the cylinder block; resampling the contour signal acquired by the eddy current sensor in each rotation cycle according to the rotational speed pulse measured by the encoder, in such a manner that a data length of the contour signal is consistent with the data length of the radial displacement signal acquired in the step (1) in each cycle;
    step (3): calculating the delay between the radial displacement signal and the contour signal with a cross-correlation method based on the characteristic extreme value, and realizing an alignment between the radial displacement signal and the contour signal by shifting the contour signal; obtaining displacements of two measured section centers of the cylinder block through the difference between the aligned radial displacement signal and the contour signal; and calculating radial vibration and tilt characteristics of the cylinder block according to the displacements of the two measured section centers of the cylinder block.

2. The non-intrusive method for measuring dynamic characteristics of an axial piston pump cylinder according to claim 1, wherein four threaded holes are manufactured on the shell of the test pump for installing the eddy current sensors, each two eddy current sensors are used as a group, and the eddy current sensors are fixed by double nuts to prevent looseness during operation.

\* \* \* \* \*